United States Patent Office 3,806,383
Patented Apr. 23, 1974

3,806,383
PROPELLANT CONTAINING COMBINATION BINDER AND BURNING RATE ACCELERATOR FORMED BY THE REACTION OF DIALKALICARBORANE WITH A PREPOLYMER
David C. Sayles, Huntsville, Ala., assignor to the United States of America as represented by the Secretary of the Army
No Drawing. Filed Mar. 7, 1968, Ser. No. 711,458
Int. Cl. C06d 5/06
U.S. Cl. 149—19          7 Claims

ABSTRACT OF THE DISCLOSURE

The catalyst is incorporated in the binder by using certain metallocarboranes as a polymerization reactant to convert monomeric butadiene into a carborane-containing prepolymer. A novel composite propellant composition having a binder which incorporates, as an integral moiety of the binder a fast-burning catalyst.

DEDICATORY CLAUSE

The invention described herein may be manufactured, used, and licensed by or for the Government for governmental purposes without the payment to me of any royalty thereon.

BACKGROUND OF THE INVENTION

In the past twenty-five years or so, great interest has been generated in solid propellants for jet propulsion devices such as missiles, rocket motors, gas generators and the like. One type of solid propellant composition which has received considerable attention is that of the composite type. A typical composite propellant composition is one that uses an organic material as the binder, aluminum as the fuel, a solid oxidant such as ammonium perchlorate plus various burning rate catalysts, and other additives. In this type of propellant composition, particularly when the propellant composition comprises only a limited quantity of binder, it is extremely difficult to incorporate sizeable amounts of burning rate catalysts and still maintain adequate physical properties of the propellant composition so that it is useable over a broad temperature range. The ballistic modifier functions to dilute the adhesive characteristics of the binder and thus, it is difficult to provide suitable adhesion to the particles of oxidizer. In addition, the matrix of binder material is so tenuous that it is difficult to provide sufficient strength and elasticity in the propellant composition structure.

Accordingly, it is an object of this invention to provide a composite propellant composition with an improved burning rate.

Another object of this invention is to provide a composite propellant composition having desirable physical properties, particularly for use in devices such as jet propulsion devices, such as, rockets, jet assisted take-off rocket motors, gas generators and the like.

A particular object of this invention is to provide a composite propellant composition having the burning rate catalyst appearing as an integral part of the binder.

SUMMARY OF THE INVENTION

A novel composite propellant composition and a method of synthesis thereof have been discovered, which method incorporates a decaborane moiety in the backbone structure of the polybutadiene prepolymer employed in making the composite propellant composition. The resulting polymeric binder imparts a considerably accelerated burning rate when converted into the composite propellant composition.

The solid propellant compositions of this invention comprise an inorganic oxidizing salt as an oxidizing agent and a synthetic polymer or copolymer containing terminal acidic groups or a synthetic copolymer of an unsaturated carboxylic acid, which has been reacted with triglycidyl-para-aminophenol, the butyleneimine adduct of trimesic acid or another aziridinyl (imine) or oxiranyl (epoxy, epoxide) compound.

Triglycidyl-para-aminophenol is represented by

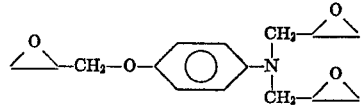

The butyleneimine adduct of trimesic acid is represented by

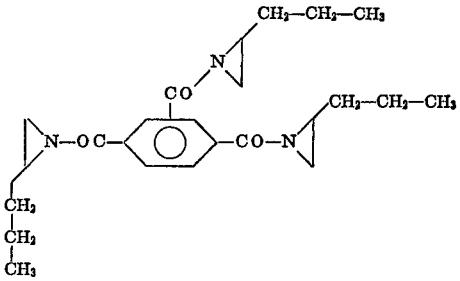

Examples of other suitable crosslinking agents are trisaziridinyl phosphine oxides and trisaziridinyl phosphine sulfides.

DESCRIPTION OF THE PREFERRED EMBODIMENTS

As previously mentioned, the novel solid propellant compositions of this invention comprise an inorganic oxidizing salt and a synthetic polymer or copolymer containing terminal acidic groups and the decaborane moiety in the polymer backbone, or a synthetic copolymer of an unsaturated carboxylic acid which has been reacted with a reactant material selected from the group consisting of aziridinyl and oxiranyl compounds such as triglycidyl-para-aminophenol, the butyleneimine adduct of trimesic acid, and other triaziridinyl phosphine oxides and triaziridinyl phosphine sulfides.

The polymers which are utilized in the solid propellant compositions of this invention comprise polymers prepared from a wide variety of materials. These materials include conjugated dienes containing from 4 to 12 carbon atoms and preferably 4 to 8 carbon atoms, such as 1,3-butadiene, isoprene, piperylene, methylpentadiene, 2-ethyl-1,3-butadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes, the preferred material is butadiene, with isoprene and piperylene also being especially especially suitable. In addition to the conjugated dienes, other monomers which can be employed are aryl-substituted olefins, such as styrene, various alkylstyrenes, para-methoxystyrene, vinylnaphthalene, vinyltoluene, and the like; heterocyclic nitrogen-containing monomers, such as pyridine and quinoline derivatives containing at least 1 vinyl or alpha-methylvinyl group, such as 2-vinylpyridine, 3-vinylpyridine, 4-vinylpyridine, 3-ethyl-5-vinylpyridine, 2-methyl-5-vinylpyridine, 3,5-diethyl-4-vinylpyridine, etc.; similar mono- and di-substituted alkenylpyridines and the like; quinolines, acrylic acid esters, such as methyl acrylate, ethyl acrylate, alkylacrylic acid esters, such as methyl methacrylate, ethyl methacrylate, propyl methacrylate, ethyl methacrylate-butyl methacrylate; methyl vinyl ether, vinyl chloride, vinylidene chloride, vinylfuran, vinylcarbazole, vinylacetylene, etc.

The above compounds in addition to being polymerizable alone are also copolymerizable with each other and may be copolymerized to form terminally reactive polymers. In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

In the first step of the preparation of the polymers containing terminal acidic groups, the monomer or monomers which it is desired to polymerize are contacted with an organoalkali compound, preferably an organopolyalkali compound. The organoalkali compounds contain at least 1 and preferably from 2 to 4 alkali metal atoms, and those containing 2 alkali metal atoms are more often employed. As will be explained hereinafter, lithium is the preferred alkali metal.

The organoalkali compounds can be prepared in several ways, for example, by replacing halogens in an organic halide with alkali metals, by direct addition of alkali metals to a double bond, or by reacting an organic halide with a suitable alkali metal compound.

The organoalkali compound initiates the polymerization reaction, the organo radical being incorporated in the polymer chain and the alkali metal being attached terminally to at least one end of the polymer chain. When employing polyalkali metal compounds, an alkali metal is attached terminally at each end of the polymer chain. The polymers in general will be linear polymers having two ends; however, polymers containing more than two ends can be prepared within the scope of this invention. These polymers can be represented by the general formula $QY_n$ where Q comprises the polymer as previously described and Y is an alkali metal, $n$ being an integer of 1 to 4. The general reaction can be illustrated graphically as follows:

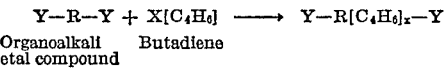

Organoalkali metal compound    Butadiene or

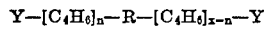

or combinations thereof.

A specific example is:

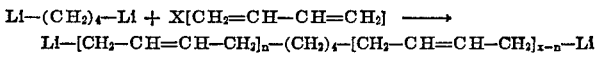

In the specific example, 1,4-addition of butadiene is shown; however, it should be understood that 1,2-addition can also occur.

While organocompounds of the various alkali metals can be employed in carrying out the polymerization, by far the best results are obtained with organolithium compounds which give very high conversions to the terminally reactive polymer. With organocompounds of the other alkali metals, the amount of monoterminally reactive polymer, that is, polymer having alkali metal at only one end of the chain is substantially higher. The alkali metals, of course, include sodium, potassium, lithium, rubidium and cesium. The organic radical of the organoalkali compound is a carborane.

While the organoalkali carborane initiators in general can be employed, certain specific initiators such as dilithiocarborane give better results than others are and preferred in carrying out the preparation of the terminally reactive polymers.

Ordinarily the dilithiocarborane compounds are preferred as being more effective in promoting the formation of terminally reactive polymers. The polymers thus formed are especially well suited for use in this invention as binders for castable rocket propellant mixtures since such materials can be cured from the liquid state to rubbery solids. The organodialkali compounds, which have been set forth as being preferred, are those which, when prepared, contain a minimum of the monoalkali metal compound. The amount of initiator which can be used will vary, depending on the polymer prepared, and particularly the molecular weight desired. Usually the terminally reactive polymers which are liquids have molecular weights in the range of 1,000 to about 20,000. Depending upon the monomers employed and the amount of initiator used, semi-solid and solid terminally reactive polymers can be prepared. Usually the initiator is used in amounts between about 0.25 and about 100 millimoles per 100 grams of monomer.

Preparation of the polymers containing terminal alkali metal atoms is generally carried out in the range of between $-100°$ and $+150°$ C., preferably between $-75$ and $+75°$ C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of initiator employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organoalkali initiators cannot be employed; however, usually more specialized operation or treatment is required with these materials, including low reaction temperatures. Since it is desirable to obtain a maximum yield of terminally reactive polymer, it is within the scope of this invention to use separation procedures, particularly with alkali metal initiators other than lithium compounds, to separate terminally reactive polymer from the polymer product.

The terminally reactive polymers prepared, as hereinbefore set forth, contain an alkali metal atom on at least one end and preferably on each end of the polymer chain and the organic radical of the initiator is present in the polymer chain. These terminally reactive polymers, when treated with suitable reagents such as carbon dioxide, sulfuryl chloride, etc., and hydrolyzed, provide polymers containing terminal acid groups. The acidic groups include groups such as $SO_2H$, $SO_3H$ or $COOH$. The following reactions present examples of specific methods which can be employed to introduce the terminal acid groups. In these equations, Q designates a polymer chain.

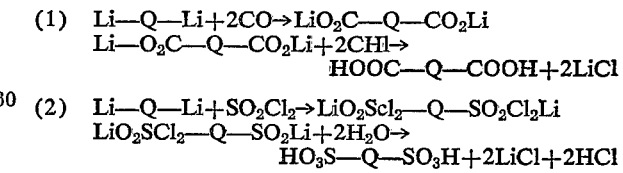

Reaction of terminally reactive polymer containing alkali metal atoms with the acid forming reagents can be carried out over a wide range of temperatures, for example $-75°$ to $+75°$ C., and preferably utilizing an amount of reagent in excess of stoichiometric.

The monomers hereinbefore described for use in preparation of terminal reactive polymers containing alkali metal atoms can also be reacted with unsaturated carboxylic acids to provide liquid polymers suitable for use in carrying out this invention. Unsaturated carboxylic acids which can be employed include acids containing up to 36 carbon atoms, from 1 to 5 double bonds and 1 or 2 carboxyl groups. Also included are the so-called "dimerized" acids, i.e., where two molecules of an acid are linked by destroying one of the double bonds. Illustrative of specific acids which can be used are acids such as acrylic acid, methacrylic acid, itaconic acid, palmitic acid, oleic acid, ricinoleic acid, arachidonic acid, erucic acid, fumaric acid, maleic acid, and the like. Reaction of the monomer with the unsaturated carboxylic acid can be carried out over a wide range of temperatures, depending on the particular monomer and the particular acid employed; e.g., at temperatures between about −50° and about +100° C. The amount of acid employed in the reaction can vary to provide polymers having an acid equivalence of from as low as 0.005 to as high as 0.2 equivalent per 100 grams of polymer product.

The tris(aziridinyl)phosphine oxides and sulfides employed in the invention can be represented by the formula

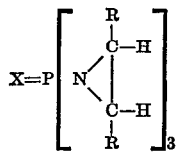

wherein X is selected from the group consisting of oxygen and sulfur, P is phosphorus, the R's are radicals containing up to a total of 20 carbon atoms selected from the group consisting of hydrogen, alkyl, cycloalkyl, aryl, alkaryl and aralkyl radicals and the R's can be unlike. Specific phosphine reactants which can be used include:

tris(1-aziridinyl)phosphine oxide,
tris(2-methyl-1-aziridinyl)phosphine oxide,
tris(2,3-dimethyl-1-aziridinyl)phosphine oxide,
tris(2-isopropyl-1-aziridinyl)phosphine oxide,
tris(2-methyl-3-ethyl-1-aziridinyl)phosphine oxide,
tris(2-isopropyl-1-aziridinyl)phosphine oxide,
tris(2-methyl-3-n-butyl-1-aziridinyl)phosphine oxide,
tris(2-hexyl-1-aziridinyl)phosphine oxide,
tris(2,3-diheptyl-1-aziridinyl)phosphine oxide,
tris(2-methyl-3-octyl-1-aziridinyl)phosphine oxide,
tris(2-ethyl-3-decyl-1-aziridinyl)phosphine oxide,
tris(2-dodecyl-1-aziridinyl)phosphine oxide,
tris(2-methyl-3-tridecyl-1-aziridinyl)phosphine oxide,
tris(2-ethyl-3-octadecyl-1-aziridinyl)phosphine oxide,
tris(2-eicosyl-1-aziridinyl)phosphine oxide,
tris(2-methyl-3-cyclopentyl-1-aziridinyl)phosphine oxide,
tris(2-ethyl-3-cyclohexyl-1-aziridinyl)phosphine oxide,
tris[2-n-butyl-3-(4-methylcyclohexyl)-1-aziridinyl]
  phosphine oxide,
tris(2-phenyl-1-aziridinyl)phosphine oxide,
tris(2-phenyl-3-tetradecyl-1-aziridinyl)phosphine oxide,
tris(2,3-diphenyl-aziridinyl)phosphine oxide,
tris(2-tert-butyl-3-phenyl-1-aziridinyl)phosphine oxide,
tris[2-ethyl-3-(1-naphthyl)-1-aziridinyl]phosphine oxide,
tris[2-n-propyl-3-(2-naphthyl)-1-aziridinyl]phosphine
  oxide,
tris(2-methyl-3-benzyl-1-aziridinyl)phosphine oxide,
tris(2-nonyl-3-benzyl-1-aziridinyl)phosphine oxide,
tris[2-n-propyl-3-(2-phenylethyl)-1-aziridinyl]phosphine
  oxide,
tris[2-methyl-3-(4-methylphenyl)-1-aziridinyl]phosphine
  oxide,
tris[2-ethyl-3-(3-n-propylphenyl)-1-aziridinyl]phosphine
  oxide,
tris[2-heptyl-3-(2,4-dimethylphenyl)-1-aziridinyl]
  phosphine oxide,
tris(1-aziridinyl)phosphine sulfide,
tris(2-methyl-1-aziridinyl)phosphine sulfide,
tris(2,3-dimethyl-1-aziridinyl)phosphine sulfide,
tris(2,3-diethyl-1-aziridinyl)phosphine sulfide,
tris(2-methyl-3-isopropyl-1-aziridinyl)phosphine sulfide,
tris(2-tert-butyl-aziridinyl)phosphine sulfide,
tris(2,3-didecyl-1-aziridinyl)phosphine sulfide,
tris(2-ethyl-3-pentadecyl-1-aziridinyl)phosphine sulfide,
tris(2-eicosyl-1-aziridinyl)phosphine sulfide,
tris(2-methyl-3-cyclohexyl-1-aziridinyl)phosphine sulfide,
tris(2-phenyl-1-aziridinyl)phosphine sulfide,
tris(2-phenyl-3-benzyl-1-aziridinyl)phosphine sulfide,
tris(2,3-diphenyl-1-aziridinyl)phosphine sulfide,
tris(2-ethyl-3-phenyl-1-aziridinyl)phosphine sulfide, and
tris(2-amyl-3-benzyl-1-aziridinyl)phosphine sulfide.

In accordance with this invention the polymers hereinbefore described are admixed with the reactant material and the inorganic oxidizing salt, after which the mixture is suitably increased in temperature such that reaction occurs between the polymer and the reactant material to provide a solid propellant structure. In the preparation of the propellant from liquid polymer, the polymer and reactant material are placed in a suitable dispersant-type mixer and thoroughly mixed for a period of 1 to 10 minutes. The oxidizer which is finely powdered to a size in the range of from about 1 to 400 microns is then added and mixing is continued for a period of 15 to 45 minutes under reduced pressure. The material at this stage is a viscous slush, which is then poured into a rocket case or suitable mold. The filled mold is placed in an oven and cured for 24 to 48 hours or more at temperatures in the range of room temperature to 170° F.

A specific example of the synthesis of the polymeric binder may be effected as follows

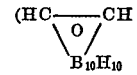

is the notation for carborane):

The carborane is reacted with two equivalents of butyllithium to form the dilithiocarborane, e.g.,

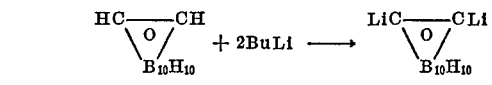

The dilithiocarborane is then reacted in an inert solvent with 1,3-butadiene, e.g.,

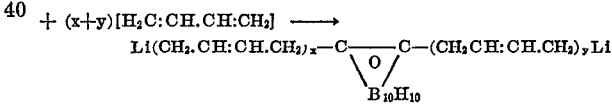

The resulting prepolymer is then treated with carbon dioxide under pressure, followed by acidification, e.g.,

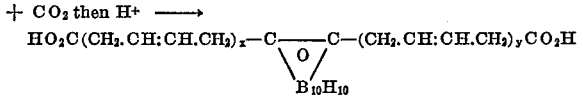

The resulting product is the polymeric binder.

This particular polymeric binder may be substituted directly for carboxyl-terminated polybutadiene in various solid propellant compositions to achieve a marked increase in the burning rates thereof, and this is achieved without any sacrifice in mechanical properties.

This polymeric binder (hereinafter referred to as a binder) is particularly attractive for use in the solid fuel grain for composite propellant compositions to be used in high acceleration, high burning rate boosters.

As mentioned earlier, the novel solid propellant compositions of this invention contain as an oxidizer an inorganic oxidizing salt. Particularly useful inorganic oxidizing salts include the ammonium alkali metal, and alkaline earth metal salts of nitric, perchloric and chloric acids and mixtures thereof, such as sodium, potassium, magnesium and ammonium perchlorates, lithium and strontium chlorates, and potassium, sodium, calcium and ammonium nitrates.

The solid propellant compositions of this invention can contain, in addition to the inorganic oxidizing salt and binder, a powdered metal and various compounding ingredients commonly employed in making composite propellants, such as plasticizers, oxidation inhibitors, reinforcing agents, wetting agents, modifiers, vulcanizing agents, curing agents, accelerators, burning rate catalysts, and the like. The propellant composition can be formed into a grain having any desired shape or geometry, such as grains of the internal, external and internal-external burning types. These grains can be molded or extruded and can be restricted with any suitable and well-known restricting material, such as rubber.

Examples of particularly desirable metals are aluminum, boron, magnesium, berryllium and the like. Alloys can also be used such as the alluminum alloys of boron, magnesium, manganese, copper and the like. Silicon can also be utilized, and the term "metal" is used herein to include silicon. Generally the components of the solid propellant compositions of this invention are present in the relative amounts of about 70 to 90 weight percent inorganic oxidizing salt, about 10 to 25 weight percent acidic polymer and about 0 to 20 weight percent powdered metal.

The novel solid propellant compositions of this invention can be used in various jet propulsion devices such as rocket motors similar to that illustrated in U.S. Pat. No. 3,087,844.

Various modifications and variations of this invention will become apparent to those skilled in the art in the light of the above teachings, which modifications or variations are within the spirit and scope of this invention.

What is claimed is:

1. A solid propellant composition comprising an inorganic oxidizing salt and a synthetic solid polymer formed by reacting, in admixture with said salt, an uncured polymer with a reactant material in sufficient amount to provide a solid propellant structure on reacting with said uncured polymer, said reactant material being selected from the group consisting of aziridinyl and oxiridinyl compounds, and said uncured polymer having been formed from the reaction of a dialkalicarborane with a monomer selected from the group consisting of conjugated dienes having 4 to 12 carbon atoms per molecule, aryl-substituted olefins, pyridine and quinoline derivatives containing at least one member selected from the group consisting of vinyl and alpha-methylvinyl acrylic acid esters, vinyl furan and vinyl carbazole, to form a prepolymer which is subsequently treated to contain at least one terminal acid group, said acid group containing an element selected from the group consisting of carbon and sulfur.

2. The composition of claim 1 wherein said uncured polymer contains from 2 to 4 terminally positioned acid groups.

3. The composition of claim 2 in which the polymer is a polymer of butadiene and said dialkalicarborane is dilithiocarborane.

4. The composition of claim 3 in which the polymer is polybutadiene, the acid group is a carboxyl group and the inorganic oxidizing salt is ammonium perchlorate.

5. The composition of claim 3 in which the acid group is a sulfuryl group and the inorganic oxidizing salt is ammonium perchlorate.

6. The composition of claim 1 wherein said uncured polymer is a copolymer of said monomer with an unsaturated carboxylic acid having a maximum of 36 carbon atoms, from 1 to 4 double bonds and from 1 to 2 carboxyl groups.

7. The composition of claim 1 wherein said inorganic oxidizing salt is present in an amount of about 70 to 90 weight percent, said uncured polymer is present in an amount of about 10 to 25 weight percent, and said solid propellant composition further comprises up to 20 weight percent powdered metal.

References Cited
UNITED STATES PATENTS

| | | | |
|---|---|---|---|
| 3,203,944 | 8/1965 | Hsieh | 260—94.3 |
| 3,257,248 | 6/1966 | Short et al. | 149—19 |
| 3,305,523 | 2/1967 | Burnside | 149—19 X |
| 3,354,116 | 11/1967 | Gruver et al. | 260—41.5 |

BENJAMIN R. PADGETT, Primary Examiner

U.S. Cl. X.R.

149—20, 22